US005662844A

United States Patent [19]

Goto et al.

[11] Patent Number: 5,662,844

[45] Date of Patent: Sep. 2, 1997

[54] PROCESS FOR THE PRODUCTION OF A FILTER

[75] Inventors: Akira Goto, Yokohama; Toshiaki Sasaki, Abiko, both of Japan

[73] Assignee: Canon Kabushiki Kaisha, Tokyo, Japan

[21] Appl. No.: 397,189

[22] PCT Filed: Jul. 11, 1994

[86] PCT No.: PCT/JP94/01128

§ 371 Date: Mar. 9, 1995

§ 102(e) Date: Mar. 9, 1995

[87] PCT Pub. No.: WO95/01878

PCT Pub. Date: Jan. 19, 1995

[30] Foreign Application Priority Data

Jul. 9, 1993 [JP] Japan .................................... 5-170099

[51] Int. Cl.[6] ...................................................... B29C 67/20

[52] U.S. Cl. ........................ 264/49; 264/53; 264/DIG. 48

[58] Field of Search ........................ 264/49, 53, DIG. 48, 264/45.4

[56] References Cited

U.S. PATENT DOCUMENTS

| | | | |
|---|---|---|---|
| 2,570,677 | 10/1951 | Honey et al. | 264/49 |
| 3,661,645 | 5/1972 | Strier et al. | 264/49 |
| 3,751,536 | 8/1973 | Bourat et al. | 264/49 |
| 3,862,030 | 1/1975 | Goldberg | 264/49 |
| 4,313,124 | 1/1982 | Hara . | |
| 4,345,262 | 8/1982 | Shirato et al. . | |
| 4,459,600 | 7/1984 | Sato et al. . | |
| 4,463,359 | 7/1984 | Ayata et al. . | |
| 4,558,333 | 12/1985 | Sugitani et al. . | |
| 4,608,577 | 8/1986 | Hori . | |
| 4,723,129 | 2/1988 | Endo et al. . | |
| 4,740,796 | 4/1988 | Endo et al. . | |
| 5,340,352 | 8/1994 | Nakanishi et al. | 264/49 |
| 5,432,205 | 7/1995 | Arnold, Jr. et al. | 521/54 |

FOREIGN PATENT DOCUMENTS

| | | |
|---|---|---|
| 54-568847 | 5/1979 | Japan . |
| 59-123670 | 7/1984 | Japan . |
| 59-138461 | 8/1984 | Japan . |
| 60-71260 | 4/1985 | Japan . |
| 62-253457 | 11/1987 | Japan . |

*Primary Examiner*—Allan R. Kuhns

*Attorney, Agent, or Firm*—Fitzpatrick, Cella, Harper & Scinto

[57] ABSTRACT

A filter for the filtration of a liquid, characterized by comprising a number of pores based on a number of microballoons formed in a hardened activation energy-setting resin layer, said pores being communicated with each other another so that said liquid can pass through said resin layer.

The filter can be desirably formed in a desired form at a desired position at a high precision. The filter is suitable for use as a filter, especially in an ink jet head.

9 Claims, 7 Drawing Sheets

55

PROCESS FOR THE PRODUCTION OF A FILTER

BACKGROUND OF THE INVENTION

1. Field of the Invention

The present invention relates to a filter made of a resin which is suitable for use in an ink jet apparatus of printing image information on a recording medium by flying ink droplets to said recording medium and to a process for the production of said filter.

2. Related Background Art

The ink jet printing system is to discharge ink through a minute nozzle whereby printing a character or image on a printing medium such as paper, cloth, plastic sheet, or the like. There have been proposed various ink jet apparatus having an ink jet head of such ink jet printing system. These ink jet apparatus have been often used as printers serving as power outputting terminals in copying machines, facsimile machines, word processors, or work stations, or as printers of the handy type or potable type installed in information processing systems such as personal computers, host computers, optical disk apparatus, and video apparatus.

Now, the ink jet head employed in the ink jet printing system generally comprises a discharging outlet for discharging ink, a liquid chamber for storing ink to be supplied to the discharging outlet, an ink pathway of communicating the discharging outlet with the liquid chamber, an energy generating element which is disposed in a given portion of the ink pathway and which serves to generate an energy for discharging ink through the discharging outlet, and an ink supply port for supplying ink into the liquid chamber from the outside of the ink jet head. The ink to be supplied to the ink jet head is supplied from an ink container through an ink supplying means. A filter for ink is usually disposed between the ink supplying means and the ink supply port or between the ink supplying means and the ink container. The ink to be supplied to the ink jet head through the ink container is flown into the discharging nozzle through the filter.

The filter used herein is required to achieve the following roles: (1) to prevent the nozzle from being clogged with contaminants such as dusts, small ink masses, or the like contained in the ink whereby preventing occurrence of non-discharging or a variation in the ink discharging direction, and (2) to prevent air from entering into the liquid chamber whereby preventing occurrence of instable ink discharging due to a decrease in the discharging energy.

As for the position for the filter to be disposed in an ink jet head, it is desired to be as close as possible to the nozzle (the discharging outlet). The reason for this is that in the case where the filter is disposed in an upstream portion of the ink supply system, although ink in the ink container can be filtrated, there is a fear for the ink to be contaminated with air during its movement until the nozzle (the discharging outlet).

As for the filter itself, it is desired to be as smaller as possible in terms of fluid resistance for the reason that especially in the case of driving an ink jet head a high speed, the ink refilling rate is decreased as the fluid resistance increases, resulting in imparting a negative influence to the high speed driving.

The filter in the conventional ink jet apparatus is constituted by ceramic, capillaries, fiber, plastic, or sintered body. In the prior art, as for the filter constituted by any of said materials, as it is difficult to be disposed at a complicated portion in the inside of the ink jet head, it is usually disposed at a given installation portion which has been intentionally established therefor. Such installation portion is established typically at a contact portion between the top plate and the ink supply pipe or a tip portion of the ink supply pipe, respectively of the ink jet head. However, in any case, as for the area of the installation portion for the filter, it is unavoidably governed by the size of the ink supply port in the ink jet head. Accordingly, there is a limit for the area of the installation portion for the filter. In this respect, the filter is necessary to be designed such that it achieve the above described roles within a limited, narrow area.

Further, in the case of fixing the filter to any of the foregoing filter installation portions, there is usually employed a manner in which the fixing is conducted with the use of an adhesive or another manner in which the fixing is conducted by way of welding by means of ultrasonic vibration or heat. However, any of these manner is problematic. That is, as the fixing manner with the use of an adhesive, there are disadvantages in that there is a fear for the filter to be clogged when the amount of the adhesive used is excessivel great, and there is another fear for the filter to be insufficient in terms of the adhesion when the amount of the adhesive used is excessively small. As for the fixing manner by way of welding, there is an requirement that the installation portion for the filter be designed to be in a desired form so that the welding can be readily conducted, and in addition to this, there is a restriction for the kind of a material as the installation portion at which the filter is to be installed.

As above described, it is generally known to use a filter constituted by a sintered body. In this case, although the situation is free of the above described problems, there is a problem in that the fluid resistance thereof is difficult to be estimated, and in addition to this, there is another problem in that it is necessary to expose the ink jet head to high temperature upon conducting the sintering, wherein an negative influence will be imparted to the ink pathway.

Thus, as for the conventional filter for an ink jet head, it is understood that there are such problems as above described because the filter is produced separately from the ink jet head and thereafter, and the filter obtained is then fixed to the ink jet head. In addition, there is a further problem in that in order to precisely dispose the filter at a limited, small portion in the vicinity of the discharging outlets of the ink jet head, a well trained skill is required.

SUMMARY OF THE INVENTION

The present invention has been accomplished in view of the foregoing subjects found in the prior art. Particularly, the present inventors made extensive studies in order to solve the foregoing problems and as a result, obtained a new filter which has been never known before.

The present invention makes it an principal object to provide a filter which can be precisely formed integrally with a constituent member of a structural body selected from devices having a complicated structure and devices having a fine structure.

The present invention is to provide a filter usable for the filtration of a liquid, characterized by comprising a number of pores formed in a hardened resin layer, said pores being communicated with each other so that said liquid can pass through said resin layer. Said pores are formed on the basis of microballoons each comprising a core composed of a material capable of expanding and vaporizing at a temperature which is higher than room temperature, said core being contained in a shell composed of a thermosetting resin as a main component.

The present invention also provides a process for producing the above filter. The process for producing the above filter comprises the steps of dispersing a number of microballoons each having a shell constituted by a solvent-soluble resin in an activation energy setting resin to obtain a dispersion, subjecting said dispersion to heat treatment to expand each of the microballoons and hardening the activation energy setting resin, treating the resultant with a solvent having a selective solubility to only the shell of each of the microballoons to remove all the shells of the microballoons whereby pores formed on the basis of the microballoons are communicated with each other to provide a filter.

The present invention makes it possible to easily form a desired filter having a desired form in a given place dedicated for a filter to be disposed therein (the given place herein may be a complicated place or a small place) at a high precision by applying the foregoing resin dispersion containing microballoons in said given place by means of a coating technique such as a screen printing process, hardening the resin dispersion applied, and subjecting the resultant to etching treatment using a solvent having a selective solubility to the resin. The filter thus formed sufficiently exhibit the functions required for a filter. Further, the filter formed may be controlled to have an appropriate fluid resistant by properly adjusting the size of the pore (or the hollow) of each of the microballoons as desired. In addition, the filter thus obtained makes it possible to remove foreign matters such as dusts without raising its fluid resistance.

The foregoing activation energy ray-setting resin used in the above serves as a binder resin and has an adhesion property. Hence, the filter can be properly disposed in a desired place without using an adhesive. And there is no particular limitation for the form of a place dedicated for a filter to be disposed therein.

The present invention includes an improved ink jet head provided with a filter in which a number of pores are formed in a hardened resin layer, said pores being communicated with each other so that liquid can pass through the resin layer, and a process for producing said ink jet head.

Particularly, the improved ink jet head according to the present invention comprises an ink discharging outlet; a substrate for said ink jet head including an electrothermal converting body comprising a heat generating resistor for generating thermal energy for discharging ink from said discharging outlet, and wirings electrically connected to said heat generating resistor so that said wirings can supply an electric signal for generating said thermal energy to said heat generating resistor; and an ink supply system for supplying ink, characterized in that a filter is disposed in a part of the ink supply system, said filter comprising a number of pores formed in a hardened resin layer, said pores being communicated with each other so that ink can pass through the resin layer.

The process for producing an ink jet head according to the present invention comprises the steps of:

(a) providing a substrate for an ink jet head, including an electrothermal converting body comprising a heat generating resistor for generating thermal energy for discharging ink, and wirings electrically connected to said heat generating resistor so that said wirings can supply an electric signal for generating said thermal energy to said heat generating resistor, (b) forming a removable solid layer at a portion corresponding to an ink flow path system comprising an ink discharging outlet, ink pathway, common liquid chamber and ink supply port on said substrate, (c) laminating a covering material so as to cover said substrate and said solid layer, (d) removing the solid layer to form an ink flow path system, (e) forming a layer composed of a dispersion comprising a number of minute hollow spheres (microballoons) each being encapsulated by a shell made of a solvent soluble resin dispersed in an activation energy setting resin (a thermosetting or photosetting resin) in at least a part of the ink flow path system, (f) subjecting the layer formed in the step (e) to heat treatment to expand each of the microballoons and hardening the activation energy setting resin (the thermosetting or photosetting resin), and (g) subjecting the dispersion layer treated in the step (f) to treatment with a solvent having a selective solubility to only the shells of the microballoons to remove the shells of the microballoons whereby pores based on the microballoons are communicated with each other to form a filter.

According to the process of the present invention, a high quality ink jet head can be produced at a good yield and a good productivity, with a high precision, and at a relatively low production cost.

The present invention is applicable to not only a black monochromic ink jet head but also to a multicolor ink jet head having a complicated configuration, a serial scanning type ink jet head, and a full-line type ink jet head. The multicolor ink jet head and full-line type ink jet head herein may be of a structure comprising a combination of a plurality of ink jet heads or an integrated structure of a plurality of ink jet heads.

The filter according to the present invention be employed also in other portions than an ink supply path in an ink jet apparatus.

DESCRIPTION OF THE INVENTION AND PREFERRED EMBODIMENTS

Figure 1:
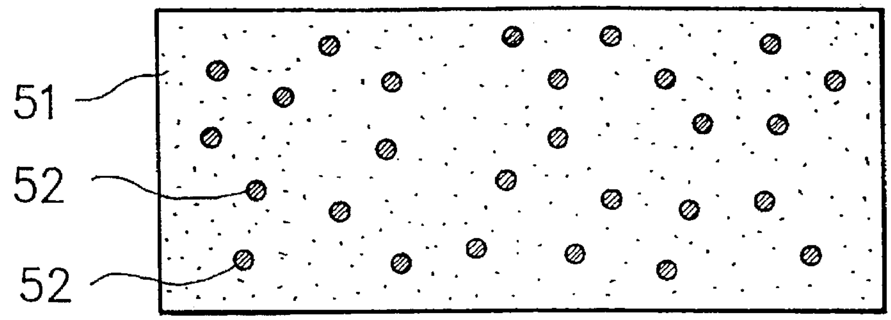
FIG. 1 is a schematic view for explaining an example of a process for producing a filter according to the present invention.
Figure 1:
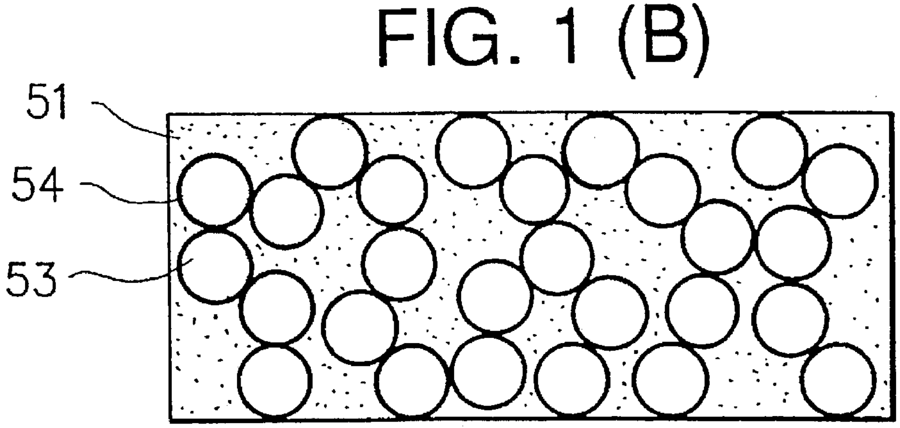
Figure 1:
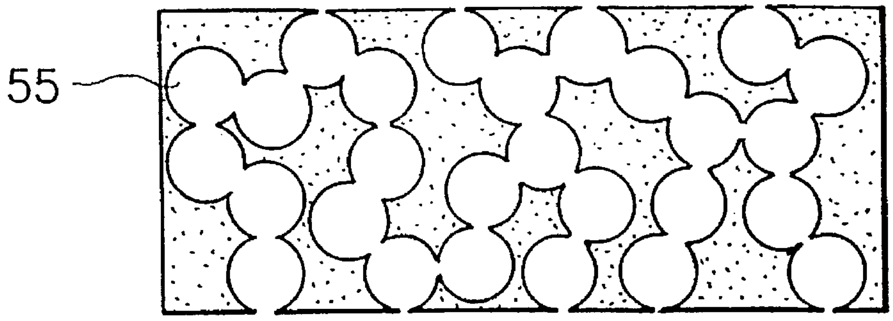

In the following, description will be made of a filter according to the present invention and a process for the production of said filter.

The filter according to the present invention has filter meshes based on a number of pores formed by using a dispersion comprising a number of microcapsules (hereinafter referred to as microballoons or microspheres) dispersed in a thermo- or photo-setting resin (that is, a binder resin), each of the microcapsules comprising a shell composed principally of a thermoplastic resin and a core component composed principally of a material having a property to expand and vaporize when heated at a temperature higher than room temperature are dispersed in a thermo- or photo-setting resin (that is, a binder resin). Description will be made of each of the microballoons. The microballoon herein means one that its volume is expanded to form a minute hollow sphere therein. Particularly, the microballoon has a property in that when the microballoon is heated, the core component is foamed (or vaporized) and along with this, the shell is thoroughly expanded, and soon after a maximum volume having been attained for the microballoon, when the heating treatment is terminated the environmental temperature is returned to room temperature, the resultant maximum volume is maintained as it is but when the heat treatment is still continued, the resultant volume is gradually reduced.

As above described, the microballoon used in the present invention comprises a shell composed principally of a thermoplastic resin and a core composed principally of a material having a property to expand and vaporize when heated at a temperature which is higher than room temperature.

Specific examples of the thermoplastic resin to constitute the shell are preferably those thermoplastic resins containing, as the main constituent, at least a component selected from the group consisting of polyvinyl chloride, polyvinylidene chloride, vinyl chloride-vinyl chloride copolymer, acrylonitrile-vinyl chloride copolymer and vinyl acetate-vinyl chloride copolymer.

As for the core, it is required that the core is vaporized at a temperature which is slightly higher than room temperature while producing a gas which does not a negative influence to a hardening resin. In view of this, the core is desired to be composed of a component selected from the group consisting of isobutane and isobutylene.

As for the microballoon thus constituted, there are known some commercially available products. Of those products, Expansel 551DU (trademark name, produced by Expancel Company of Sweden) is the most desirable.

The filter according to the present invention comprises a porous resin hardened material produced by utilizing pores provided by microballons constituted as above described. The filter according to the present invention is advantageous in that since the binder resin has an adhesion property, it is not necessary to use an adhesive upon disposing the filter, and because of this, the filter is free of occurrence of the problem relating to clogging which is found in the prior art. In addition, there is another advantage in that welding or the like is not necessary to be conducted upon the installation and thus, the filter is free of any restriction in relation to the place where it is disposed or the form therefor. There is a further advantage in that since the starting filter-forming material (that is, the foregoing dispersion comprising the microballons and the binder resin) is in the liquid state before it is hardened, it can be readily applied not only in a small portion but also in a portion having a complicated structure, and it is possible to install a desirable filter at a desired place where the known filter cannot be disposed. And the filter according to the present invention is similar or superior to the known filter in terms of the functions required for a filter.

As the binder resin used for dispersing the microballoons, there is used a hardening resin having a property to harden with the action of an activation energy (light or heat energy). Such hardening resin can include thermosetting resins and photosetting resins. Specific examples are epoxy resin, acrylic resin, diglycol alkylcarbonate resin, unsaturated polyester resin, polyurethane resin, polimide resin, melamine resin, phenol resin, and urea resin. Of these, epoxy resin, particularly, ODER SY25 (trademark name, produced by Tokyo-Ohka Kabushiki Kaisha) is the most desirable as the thermosetting resin, and as the photosetting resin, acrylic resin, particularly NITRON 8526 (trademark name, produced by Nittodenko Kabushiki Kaisha) is the most desirable.

As for the filter according to the present invention, the current resistance thereof is substantially governed by the pores provided by the microballoons. That is, the fluid resistance of the filter can be properly controlled by adjusting the diameter of the pore (the minute hollow sphere) formed by each of the microballons and the content proportion of the microballons to the binder resin. The control of the pore diameter herein can be conducted by a manner (1) in which the volume of each of microballoons is made to be of a desired magnitude by properly controlling the temperature upon the heat treatment while utilizing the foregoing properties of the microcapsule or a manner (2) in which the diameter of the core of each of non-expanded microballons is adjusted as desired. However, since there is a limit for the expansion magnitude of the core diameter by means of the heat treatment, it is desired to use the manners (1) and (2) in combination so that the pore of each of the microballoons becomes to have a desired diameter.

Now, in order that the binder resin (the thermosetting or photosetting resin) containing the above described microballoons functions as a filter, pores formed by the microballoons are necessary to be communicated with each other.

In order to communicate the pores with each other, after the binder resin is hardened, the shells (composed of the thermoplastic resin) of the microballoons are necessary to be removed by resolving them in a solvent. The solvent usable must be such a solvent that does not impart any negative influence to the binder resin after having been hardened and has a selective solubility to only the shells. Specific examples of such solvent are acetone and dimethylformamide (DMF). In the above, it is necessary for the microballoons to be contacted with each other. This requirement can be attained by the above described manner for controlling the current resistance of the filter.

As for the dispersion comprised of the binder resin containing the microballoons dispersed therein which causes the formation of a filter, the content of the microballoons is desired to be in the range of 20 to 90 wt. %. When the content of the microballoons in the dispersion is less than the lower limit of said range, there is a tendency that the microballoons are not sufficiently contacted with each other to result in providing a product which does not function as a filter. On the other hand, in the case where the content of the microballoons in the dispersion is beyond the upper limit of the above described range, there is a tendency of providing such a filter that is insufficient in strength and does not possess a desirable current resistance.

Now, in order to ensure mutual contact among the microballoons in the dispersion, the heat treatment for the dispersion is desired to be conducted at a relatively high temperature. However, in this case, the binder resin is likely to suffer from a certain negative influence.

Therefore, in order to stably obtain a desirable filter, the conditions for the production thereof should be optimized while having a due care about the above described points.

By the way, as for a filter used in an ink jet head, it is used chiefly for the purpose of preventing its discharging outlets from being clogged with foreign matters. And the discharging outlets of the ink jet head are usually of a size of 25 to 50 μm in diameter. In view of this, it is understood that a basic requirement for the filter is to remove foreign matters having a size which is greater than the above size. In general, as the foreign matters to be removed by the filter in an ink jet head, there can be considered those having a size of 30 to 50 μm in diameter. In this connection, it is desired for each pore (or each minute hollow sphere) formed by the microballoons to be of a size of 30 μm or less in diameter.

Further, in practical use of an ink jet head, there will be an occasion wherein a given discharging outlet of the ink jet head is clogged with a plurality of foreign matters such that it does not perform its ink discharging performance. In order to prevent occurrence of this problem, it is generally known to dispose a mesh filter of 8 to 15 μm in bore diameter in the ink jet head. As for such conventional filter, it is known that the smaller the bore size becomes, the higher the fluid resistance becomes. Referring to the ink jet head provided with such filter, it is known that when the fluid resistance in the ink jet head is more than 200 mmAq in HD, normal ink discharging cannot be conducted. Other than this, in the case of subjecting the ink jet head to printing at high speed, it is known that the fluid resistance of the filter is desired to be as lower as possible in view of necessity of raising the ink supply efficiency.

In view of these situation, the filter according to the present invention is desired to be structured such that it functions to effectively remove foreign matters contained in ink, without reducing the size of each of the pores formed. For this purpose, it is desired for the filter to be designed to have a thickness corresponding to a value of 5 times or more over the diameter of a pore formed by one of the microballoons in the direction in parallel to the ink supplying direction (or in the direction along the ink flow path when disposed therein).

In the following, description will be made of a process for producing a filter according to the present invention with reference to FIGS. 1(A) to 1(C).

FIG. 1(A) is a schematic cross-sectional view illustrating a layer composed of a dispersion comprised of microballoons dispersed in a binder resin. FIG. 1(B) is a schematic cross-sectional view illustrating a dispersion layer obtained by subjecting the dispersion layer shown in FIG. 1(A) to heat treatment wherein the core components of the microballoons have been vaporized to expand the resin shells. FIG. 1(C) is a schematic cross-sectional view illustrating a product obtained by subjecting the treated dispersion layer shown in FIG. 1(B) to etching treatment using a selectivity-bearing solvent wherein the resin shells have been dissolved to communicate pores based on the microballoons with each other.

In the production of a filter according to the present invention, first, a number of microballoons 52 (each comprising a core component and a shell) are dispersed in a hardening resin 51 as a binder resin as shown in FIG. 1(A). The dispersing operation herein is conducted by means of a conventional homogenizing means such as homogenizer or the like. Then the microballoons-containing hardening resin dispersion is subjected to heat treatment at a desired temperature, wherein each of the microballoons is expanded to a desired magnitude. Particularly, in this treatment, when the microballoons are heated, a volatile core material 53 of each microballoon is vaporized to expand the microballoon as shown in FIG. 1(B). For instance, when microballons of Expancel 551DU (trademark name, produced by Expancel Company) are used as the microballoons 52 and they are heated to 120° C., the microballoons originally of 7 μm in mean particle size are expanded to have a mean particle size of about 20 μm. Soon after this, when the thus expanded microballoons are quickly returned to room temperature, thermoplastic resin shells 54 are cooled to harden, wherein the pores resulted are made to maintain their diameter upon the expansion.

Thereafter, the binder resin 51 in which the microballoons in expanded state are contained is subjected to hardening treatment.

Now, when the hardening resin as the binder resin comprises a thermosetting resin, the binder resin is liable to harden upon expanding the microballoons. Therefore, it is necessary to have a due care so that the binder resin is not hardened upon expanding the microballoons and after the microballoons having been expanded as desired, the binder resin is hardened.

The present inventors made experimental studies of the conditions that enable the binder resin to be hardened after expanding the microballoons to be in a desired state, while paying attentions to the quantity of an energy that makes the microballoons expanded as desired and also to the quantity of an energy that makes the binder resin hardened. As a result, the following findings were obtained. That is, as for the binder resin comprising a thermosetting resin, the condition for it to be hardened is to apply a given amount of an energy thereto. On the other hand, as for the condition for the microballoons to be expanded, the diameter of each microballoon expanded is governed by the maximum quantity of an energy applied. Therefore, by promptly heating a dispersion comprising microballoons dispersed in a thermosetting resin to a predetermined temperature at which each of the the microballoons can be expanded to have a desired diameter, the microballoons can be expanded as desired prior to hardening the thermosetting resin. In the case where the binder resin comprises a photosetting resin, the binder resin is not hardened by heat and thus, such heating treatment as described above is not necessary to be conducted. In this case, the binder resin can be properly hardened by irradiating light thereto after conducting the step of expanding the microballoons, wherein the microballoons expanded can be readily controlled in terms of their diameter.

After the above step, the resin shells of the microballoons in hardened state after the completion of the hardening of the binder resin are resolved with a solvent such as acetone to form pores 55 based on the microballoons, whereby the formation of a filter is completed. (see, FIG. 1(C)).

In the above described process, non-expanded microballoons are dispersed in a binder resin. Alternatively, it is possible to provide expanded microballoons, followed by dispersing them in the binder resin. In this case, even in the case of using a thermosetting resin as the binder resin, there can be obtained an improved filter by gradually hardening the binder resin at a low temperature over a long period of time. In the case where the content of the microballoons contained in the binder resin is raised, it is desired to disperse non-expanded microballoons in the binder resin.

The dispersion used in the present invention which comprises the microballoons dispersed in the binder resin is in a liquid state unless it is hardened. Thus, it can be applied to a desired place by means of a coating or injecting technique. The step of forming the dispersion layer is conducted before the binder resin is hardened. Particularly, the step of heating the microballoons may be conducted after or before the formation of the dispersion layer.

In the following, experiments which were conducted by the present inventors in order to attain an objective filter of the present invention will be described.

EXPERIMENT 1

In this experiment, photosensitive resist ODER SY25 (trademark name, produced by Tokyo-ohka Kabushiki Kaisha) was firstly provided as the binder resin, to this binder resin, non-expanded microballoons of Expancel 551DU (trademark name, produced by Expancel Company) were added in an amount of 50 wt. %, and the resultant was homogenized by means of a homogenizer, whereby a dispersion was obtained. Then, a glass substrate with a positive type resist layer having been hardened and solubilized was provided. On the surface of this glass substrate, the dispersion was applied by means of a screen printing technique to form a dispersion layer, followed by drying at 60° C. for 2 hours. The dispersion layer having been dried was found to have a thickness of 100 u±10 um and to be free of defects liable to occur due to addition of the 50 w % of microballoons (such as layer removal upon the screen printing, undesirable thickness distribution, or stain upon the screen printing). The above dispersion layer having been dried was heated to 120° C. wherein the microballoons in the dispersion layer started expanding at the initial stage and the layer became to have a thickness of 180 μm after the lapse of 3 minutes. By this, a number of pores of 60 um were formed in the dispersion layer. Thereafter, the dispersion layer was subjected to exposure, and the hardened resin shells of the microballoons were then removed by dissolving them in acetone. Thus, there was obtained a filter having a porous structure.

In this experiment, as for the mean average particle size of the microballoons in the dispersion layer, it was 7 um before the expansion and about 20 um after the expansion.

EXPERIMENT 2

The procedures of Experiment 1 were repeated, except that the non-expanded microballoons were replaced by expanded microballoons of EXPANCEL 551DE-20 (trademark name, produced by Expancel Company) and the heat treatment was not conducted, to thereby obtain a filter.

EXPERIMENT 3

The procedures of Experiment 1 were repeated, except that a thermosetting resist NOTRON T8526 (trademark name, produced by Nittodenko Kabushiki Kaisha) was used as the binder resin and no exposure was conducted, to thereby obtain a filter.

EXPERIMENT 4

The procedures of Experiment 2 were repeated, except that a thermosetting resist NOTRON T8526 (trademark name, produced by Nittodenko Kabushiki Kaisha) was used as the binder resin and no exposure was conducted, to thereby obtain a filter.

EXPERIMENT 5

The procedures of Experiment 3 were repeated, except that the step of drying the filter-forming material was not conducted and the heat treatment in the heating step was conducted by quickly heating until 120° C., to thereby obtain a filter.

EXPERIMENT 6

The procedures of Experiment 1 were repeated, except that the acetone as the solvent was replaced by ethanol, to thereby obtain a filter.

EXPERIMENT 7

The procedures of Experiment 1 were repeated, except that the content of the microballoons was changed to 10 wt. %, to thereby obtain a filter.

EXPERIMENT 8

The procedures of Experiment 1 were repeated, except that the content of the microballoons was changed to 20 wt. %, to thereby obtain a filter.

EXPERIMENT 9

The procedures of Experiment 1 were repeated, except that the content of the microballoons was changed to 90 wt. %, to thereby obtain a filter.

EXPERIMENT 10

The procedures of Experiment 1 were repeated, except that the content of the microballoons was changed to 95 wt. %, to thereby obtain a filter.

As for each of the filters obtained in Experiments 1 to 10, evaluation was conducted with respect to the under-described evaluation items. The evaluated results obtained are collectively shown in Table 1.

Pore Diameter:

As for the pores formed, their diameters were examined using a metallographic microscope. Based on the examined results, there was obtained a mean value. The result obtained is shown in Table 1.

Dispersed State of the Microballoons in the Dispersion:

The dispersion state of the microballoons was observed by means of a metallographic microscope. The observed result is shown in Table 1 on the basis of the following criteria: L for the case of rough dispersion, M for the case of suitable dispersion, and H for the case of dense dispersion.

Fluid Resistance as a Filter:

As for each filter, its fluid resistance was measured by means of a manometer, wherein water was used as the liquid. The measured result is shown in Table 1.

Filter Performance:

As for each filter, evaluation was conducted of whether it could remove foreign matters of 30 μm or more in size by passing ink containing such foreign matters therethrough. The evaluated result obtained is shown in Table 1 on the basis of the following criteria: ○: for the filter which sufficiently performs as a filter, and X for the filter which does not perform as a filter.

Now, as for the current resistance for a filter, it is somewhat different depending on the diameter of a foreign matter to be removed, but in general, it is desired to be in the range of 10 to 100 mmAq.

As apparent from Table 1, it is understood that any of Experiments 1, 2, 4, 5, 8 and 9 belonging to the present invention makes it possible to form a filter having an excellent performance.

As for Experiments 3, 6, 7 and 10, it is understood that any of the filters obtained in these experiments does not exhibit a sufficient filter performance. As for the reasons for this, there can be illustrated those factors which will be described below.

As for the case of Experiment 3, it can be considered such that the binder resin was hardened without the microballoons having been expanded; particularly, the drying treatment was conducted at a temperature lower than the temperature at which the microballoons would start expanding, and because of this, during the drying treatment, the thermosetting resin as the binder resin was hardened such that the microballoons could not be expanded; hence, the formation of a filter structure of exhibiting a filter performance could not be conducted.

As for the case of Experiment 6, it can be considered such that the resin shells could not be sufficiently dissolved because ethanol was used as the solvent and as a result, mutual communication could not be attained among the entire pores; hence, the formation of a filter structure of exhibiting a filter performance could not be conducted.

As for the case of Experiment 7, it can be considered such that the content of the microballoons was excessively low and because of this, no sufficient contact could be attained among the microballoons having been expanded; accordingly, mutual communication could not be attained among the entire pores based on the microballoons.

As for the case of Experiment 10, it can be considered such that the content of the microballoons was excessively great to cause the formation of pores in an excessively great amount and because of this, a filter structure having a sufficient strength could not be attained; hence, the formation of a filter structure of exhibiting a filter performance could not be conducted.

In the following, description will be made of cases wherein a filter according to the present invention is employed in an ink jet apparatus. Particularly, description will be made of an ink jet apparatus in which a filter according to the present invention can be applied, with reference to the drawings.

Figure 2:
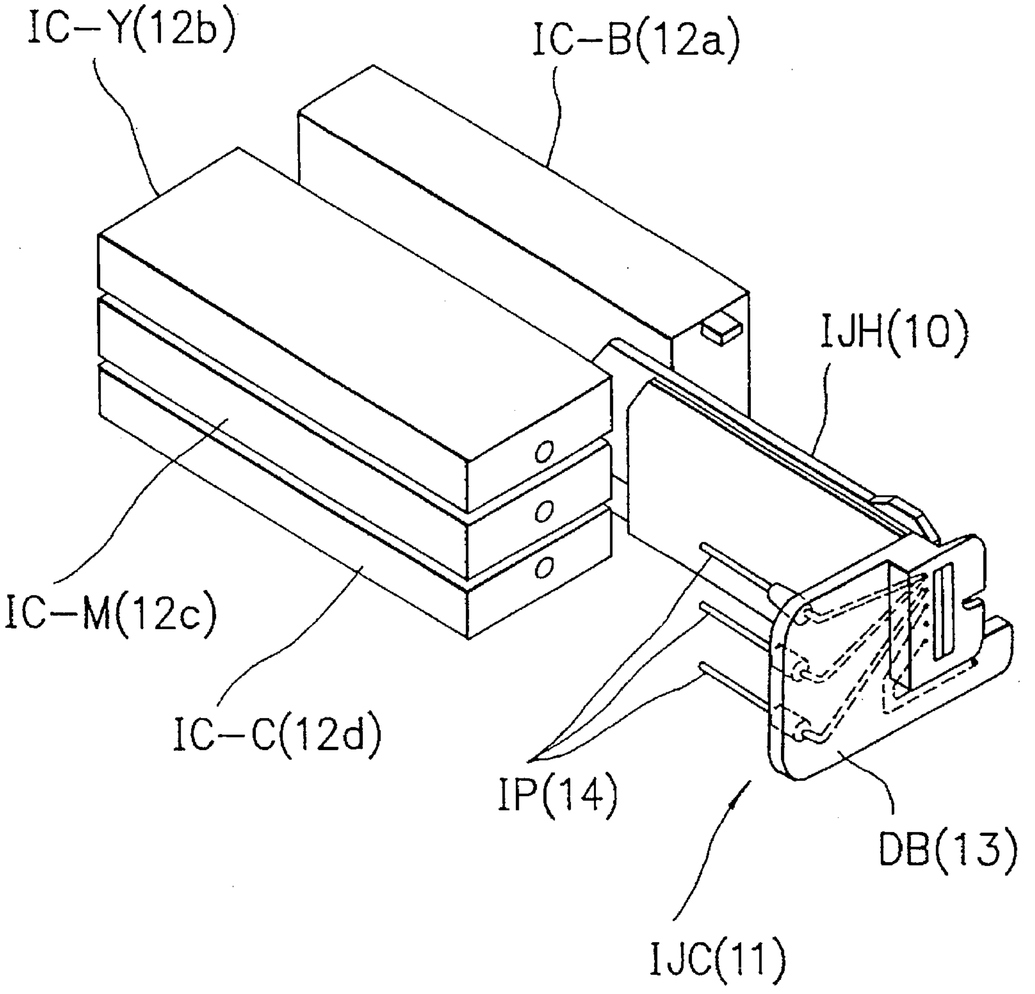
FIG. 2 is a schematic slant view illustrating the entire constitution of an ink jet cartridge having an ink jet head based on the present invention and an ink cartridge.
Figure 4:
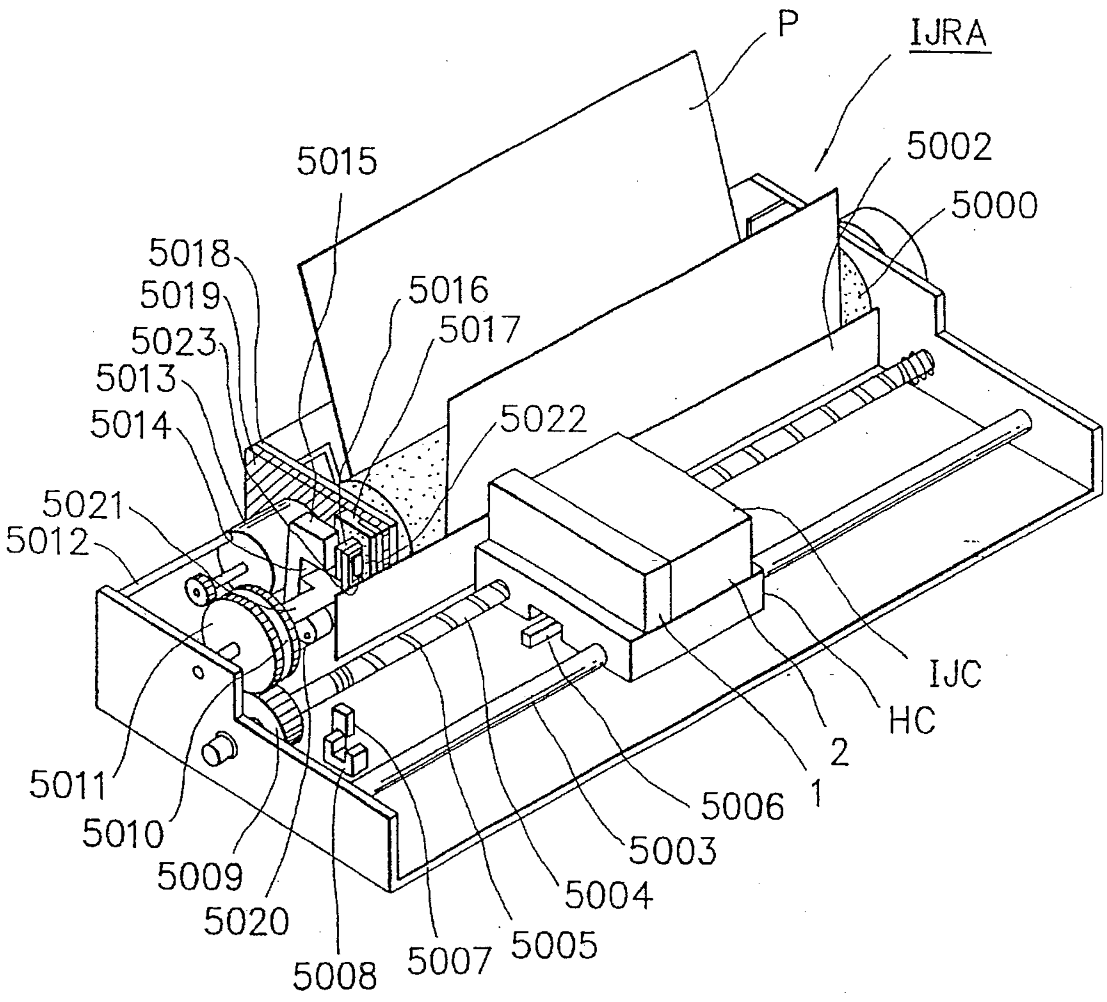
FIG. 4 is a schematic slant view illustrating an ink jet apparatus in which an ink jet cartridge based on the present invention is installed.

FIGS. 2 and 4 are schematic views illustrating an example of an ink jet head in which a filter according to the present invention can be applied and an example of an ink jet printer in which a filter according to the present invention can be applied, respectively.

In the former Figure, IJH indicates an ink jet head of the system in which ink is discharged to a recording sheet using a bubble caused by thermal energy, IJC (11) indicates an ink jet cartridge which includes an ink jet head IJH (10) integrated with ink cartridges IC (12) for supplying ink to the IJH and which is detachable to an apparatus, and IJA indicates an ink jet apparatus body.

As apparent from the slant view of FIG. 2, the ink jet cartridge IJC in this embodiment is of a configuration in which a tip portion of the ink jet head IJH is projected a bit beyond the front face of the ink cartridge IC. As will be later described, the ink jet cartridge IJC is fixed to a carriage HC mounted in an ink jet apparatus body IJA, but it is of a disposable type which is detachable to the carriage HC. The ink cartridge IC (12) which stores ink to be supplied to the ink jet head IJH comprises an ink absorbent, a vessel for housing said ink absorbent and a covering member for sealing the vessel (not shown in the figure). The ink cartridge IC (12) is charged with ink, and the ink contained therein is successively supplied to the ink jet head side in accordance with ink discharging.

The ink cartridge herein is for printing a color image and it comprises four different ink cartridges (12*a*, 12*b*, 12*c* and 12*d*) respectively corresponding to ink of each color of black (Bk), cyanogen (C), magenta (M) and yellow (Y). These ink cartridges separately supply given ink to a distributor DB (13) of the ink jet head through an ink supply pipe IP (14). The distributor DB (13) is provided with four ink supply nozzles each connected to one of the foregoing ink cartridges IC-B (12*a*), IC-Y (12*b*), IC-M (12*c*) and IC-C (12*d*). The ink cartridge system may comprise a system in which the three different color cartridges IC-Y, IC-C, and IC-M are integrated or other system in which they are separately arranged. These two systems may selectively used depending as the need arises.

The ink cartridge is designed so that it can be detached by a user. Therefore, when ink in the ink cartridge is old, the ink cartridge can be replaced by new one. In this case, when a bubble should be occurred between the ink supply nozzle and the ink container, it is removed by a recovery mechanism disposed in the apparatus body IJA so as to prevent occurrence of defective printing. In the distributor DB (13), there is disposed a filter for preventing flow-in of a foreign matter, which serves protect the nozzle and ink supply pipe from being clogged by a foreign matter flown from the ink container. Further, a filter valve is disposed in the nozzle communicated with the ink cartridge IC-B in order that bubbles accumulated in the filter portion can be readily removed upon the recovery operation.

The constitution of the ink jet head based on the present invention will be described in more detail.

Figure 3:
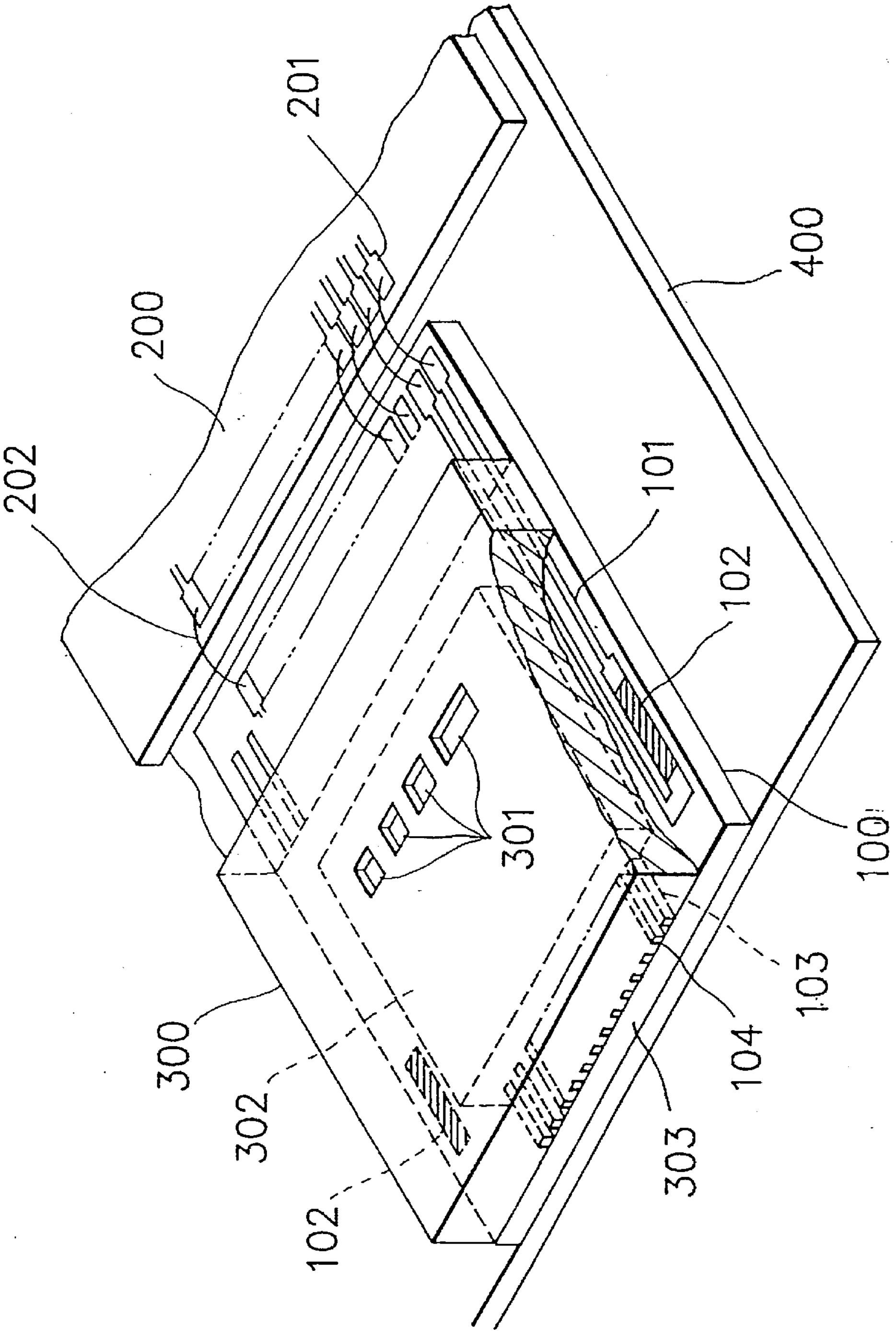
FIG. 3 is a schematic slant view illustrating a detailed constitution in the vicinity of an ink supply port of an ink jet head based on the present invention.

In FIG. 3, reference numeral 100 indicates a heater board prepared by the conventional film-forming technique, said heater board comprising a plurality of electrothermal converting bodies (or discharging elements) 102 arranged in row on a Si base member 303 and electric wires 101 made of Al or the like for supplying an electric power to said electrothermal converting bodies. Reference numeral 200 indicates a wiring board for the heater board 100. The wiring board 100 contains wirings corresponding to the wirings of the heater board 100 (the former wirings are connected to the latter wirings, for instance, by means of wire bonding 202) and pats 201 each situated at an end portion of each of the former wirings and which serve to receive electric signals from the apparatus body. Reference numeral 300 indicates a top plate provided with concaved portions of providing a plurality of ink pathways and a common liquid chamber 302 for storing ink to be supplied to each ink pathway, a plurality of ink supply ports 301 respectively corresponding to each color ink and each for supplying the corresponding ink to the common liquid chamber, partition walls each for dividing ink supplied from each ink supply port in the common liquid chamber, and portions for forming a plurality of orifices 104 for discharging ink. The top plate forms ink pathways between the ink supply ports 301 which receive ink from supplied from the ink cartridges IC and introduce the ink into the common liquid chamber 302 and the orifices 104. The top plate having such concaved portions is comprised of, for example, a processed glass member. The processed glass member herein may be, for example, borosilicate glass. However, the processed glass member may be of other glass. And instead of such processed glass member, molding resin materials can be used.

The top plate 300 is joined to the discharging element 100 with the use of an epoxy resin series adhesive. This adhesive can include photosetting adhesives, adhesives capable of being hardened with light energy and thermal energy in combination, and thermosetting adhesives.

The bonding of the discharging element 100 is conducted with a silicon series or epoxy series adhesive. As the adhesive used herein, there is selectively used one which provides a desirable adhesion for the discharging element and possesses a good thermal conductivity so that a heat generated by the discharging element is dissipated.

The distributor DB is held by the base member (or the base plate) 400, wherein the distributor is desirably positioned by means of the three positioning holes while being heat welded. As for the connection between the distributor DB and the discharging element 100, sealing is made between the ink supply unit and the ink supply ports 301 by means of a two-liquid sealing material. And the wire-bonded portion between the discharging element and the wiring board is also sealed using the sealing material.

The ink jet head IJH in this embodiment is fixed to a carriage HC and it is designed such that only the ink cartridge can be exchanged by new one when the ink therein is terminated. Hence, the ink jet head ensures to stably conduct high quality printing without causing a variation among prints obtained.

FIG. 4 is a schematic view illustrating the constitution of an ink jet head apparatus in which the present invention is applied. Referring to the figure, a lead screw 5005 rotates by way of drive transmission gears 5011 and 5009 by the forward and backward rotation of a driving motor 5013. The lead screw has a helical groove 5004 with which a pin (not shown) of a carriage HC is engaged, by which the carriage is reciprocable in a given direction. Reference numeral 5002 indicates a sheet confining plate for confining a sheet on a platen 5000 over the carriage movement range. Home position detecting means 5007 and 5008 are in the form of a photocoupler to detect the presence of a lever 5006 of the carriage, in response to which the rotational direction of of a motor 5013 is switched. Reference numeral 5016 indicates a supporting member for supporting the front side surface of an ink jet head to a capping member 5022 for capping the ink jet head. Reference numeral 5015 indicates sucking means which function to suck the ink jet head through an opening 5023 of the cap so as to recover the ink jet head. Reference numeral 5017 indicates a cleaning blade which is moved toward front and rear by a moving member 5019. They are supported on a supporting flame 5018 of the main apparatus body. The blade may be in another form, specifically, a known cleaning blade. Reference numeral 5012 indicates a lever which is effective to start the sucking recovery operation, and it is moved with the movement of a cam 5020 engaging the carriage. The driving force from the driving motor is controlled by a conventional transmitting means such as clutch or the like.

The capping, cleaning and sucking operations can be performed when the carriage is at the home position by means of the lead screw. However, the present invention is applicable also in any other ink jet heads wherein such operations are effected at different timing.

In the following, as for the case where a filter according present invention is used in an ink jet head, description will be made of a desirable process for producing such ink jet head.

Firstly, as for the production of an ink jet head, there are known the following three processes.

A first process comprises a step wherein a substrate having an electrothermal converting body containing energy generating elements is provided; a step wherein a top plate obtained by subjecting an appropriate member made of glass or a metal to cutting and etching treatments to form concaved portions for the formation of a discharging outlet, ink pathway and liquid chamber and to form an ink supply port for communicating a liquid chamber to the outside is provided; a step wherein the top plate is joined to the substrate using an adhesive while positioning the energy generating element and ink pathway as desired; and a step wherein an ink filter is adhered to the ink supply port, an ink supply unit is superposed and fixed to the ink supply port, and a sealing material is poured around the related ink communication path to fix the entire.

As for this first process for the production of an ink jet head, there are problems. That is, when the ink supply port formed in the top plate is contacted with the ink supply unit through the the ink filter, a clearance is liable to occur between the top plate and the ink supply unit due to an insufficient precision in the thickness of the top plate and an insufficient precision in the formation of the ink supply unit. In the case where such clearance is present, the foregoing sealing material is flown into the inside through the clearance wherein the surface of the filter is contaminated with the sealing material flown, resulting in making ink bubbling unstable to provide a defective print.

A second process comprises a step wherein a substrate having an electrothermal converting body containing energy generating elementes is provided; a step wherein a top plate made of a resin which is provided with an ink discharging outlet, ink pathway and liquid chamber having been integrally formed by an injection molding process is provided; a step wherein the top plate is press-fixed to the substrate so as to establish a clearance, for instance, using a spring, while positioning the energy generating element and ink pathway as desired; a step wherein an ink supply unit having a cantilever structure provided with an ink filter adhered to the joint with an ink container is contacted to an ink supply port having been formed at the top plate upon conducting the above injection molding process; and a step wherein not only the clearance between the substrate and the top plate but also the press-contacted portion between the ink supply unit and ink supply port are respectively sealed using a different sealing material.

In the second process for the production of an ink jet head, as above described, not only the clearance previously provided between the substrate and the top plate but also the portion through which the ink supply port of the top plate and the ink supply unit separately molded are contacted by virtue of the elastic force of the ink supply unit are respectively sealed at the same time. In this case, the top plate and ink supply unit are governed by the top plate such that an effective area for the ink filter cannot be established as desired. In order to eliminate this problem, there is known a manner in which a large area ink supply port is formed on the ink container side of the ink supply unit and a mesh ink filter is welded thereto so as to prevent foreign matters from getting into the common liquid chamber. However, there are still problems in this case in that the foregoing sealing material is liable to enter through the joint between the substrate and the top plate to contaminate the surface of the heat generating resistor as the energy generating element, resulting in clogging the discharging outlet to make ink bubbling unstable wherein a defective print is provided.

In order to eliminate the problems in the first and second processes, there is known a third process which will be described below.

The third process comprises a step wherein a base member provided with an electrothermal converting body containing energy generating elements is provided, a photosensitive dry film of the positive or negative type is laminated over said base member, the resultant is subjected to light exposure while masking a pattern for forming an ink discharging outlet, ink pathway, and liquid chamber to the photosensitive dry film, followed by development to thereby form a solid layer having patterned portions corresponding to the discharging outlet, ink pathway and liquid chamber on the base member; a step wherein an activation energy ray-setting material capable of being hardened by an activation energy ray is applied over the solid layer and the base member at a given thickness, and a top plate made of an activation energy transmissive material, which is provided with a concaved portion for forming a part of the liquid chamber and a ink supply port, is superposed and adhered on the activation energy ray-setting material applied while positioning the concaved portion to a liquid chamber-forming portion whereby obtaining a stacked body; a step wherein the activation energy ray-setting material of the stacked body is subjected to irradiation of an activation energy ray through the top plate while masking the top plate so as to shield the liquid chamber-forming portion of the activation energy ray-setting material to thereby harden the activation energy-ray setting material; a step wherein the stacked body the activation energy ray-setting material of which having been partly hardened is cut through a position where a discharging outlet is to be formed whereby exposing an end face of the solid layer, and the resultant is immersed in a solvent capable of dissolving the solid layer and a uncured portion of the activation energy ray-setting material to remove the solid layer and the uncured portion of the activation energy ray-setting material from the stacked body whereby forming an ink pathway-forming space and a liquid chamber-forming space in the inside; and a step wherein an ink supply unit having a mesh ink filter is installed therein is superposed and fixed to the ink supply port while maintaining a clearance between them and a sealing material is poured to the peripheries of the resultant (see, Japanese Unexamined Patent Publication No. 253457/1987).

However, as for this third process for the production of an ink jet head, there are such problems as will be described below.

That is, as for the third process, although there are an advantage in that an ink jet head having a large liquid chamber can be produced by enlarging the concaved portion for forming a part of the liquid chamber which is disposed in the top plate and another advantage in that the foregoing problems occurred by joining the substrate and top plate in the first process can be solved, there are disadvantages such that the process is complicated, it takes a relatively long period of time, and it is poor in productivity. In addition, there is a further problem in that when the ink jet head produced according to the third process is used in a specific system such as an integrated four color system or an integrated three color system, the disposition of a filter is liable to cause color mixing problems in the structure.

In view of these problems, the present inventors found a process for producing an ink jet head using a filter according to the present invention.

The process for the production of an ink jet head according to the present invention comprises the steps of:

(a) preparing a substrate for an ink jet head, including an electrothermal converting body having a heat generating resistor capable of generating thermal energy for discharging ink and electric wirings electrically connected to said heat generating resistor, said electric wirings being capable of supplying an electric signal for generating said thermal energy;

(b) forming a removable solid layer in a given area on the substrate, corresponding to an ink flow path system including an ink discharging outlet, ink pathway, common liquid chamber and ink supply port;

(c) laminating a covering material so as to cover the substrate and the solid layer formed thereon, (d) forming said ink flow path system by removing the solid layer;

(e) forming in at least a part of the ink flow path system a layer composed of a dispersion comprising a number of minute hollow spheres (microballoons) each encapsulated by a shell made of a solvent soluble resin dispersed in an activation energy ray-setting resin (a thermosetting or photosetting resin);

(f) subjecting the layer formed in the step (e) to heat treatment to expand each of the microballoons and to harden the activation energy ray-setting resin (or the thermosetting or photosetting resin); and (g) subjecting the dispersion layer treated in the step (f) to treatment with the use of a solvent having a selective solubility only to the shell of each of the microballoons to remove the shell of each of the microballoons, whereby pores based on the microballons are communicated with each other thereby forming a filter.

The above described process for the production of an ink jet head will be described in more detail.

That is, the preparation of the above substrate may be conducted by forming the foregoing electrothermal converting body on a base member by way of a conventional film-forming technique generally used in the semiconductor field. Thereafter, the solid layer composed of a removable material is formed in a given area where an ink discharging outlet, ink pathway, liquid chamber and ink supply port are to be formed on the substrate. The solid layer herein may be formed at a good precision by means of photolithography using a positive type photosensitive resist.

Then, a hardening resin is applied so as to cover the substrate and the solid layer formed on the substrate. It is possible to join a top plate having a liquid chamber and ink supply port formed therein to the resultant substrate having the covering material laminated thereon.

The removable solid layer of the stacked body obtained in the above is treated with an appropriate solvent whereby the solid layer is removed. By this, there are formed an ink discharging outlet, ink pathway, liquid chamber and ink supply port.

During such process of producing an ink jet head, a filter is formed by forming a layer composed of a dispersion comprising a number of minute hollow spheres (microballoons) each encapsulated by a shell made of a solvent soluble resin dispersed in an activation energy ray-setting resin (a thermosetting or photosetting resin), hardening the activation energy ray-setting resin (or the thermosetting or photosetting resin), and subjecting the dispersion layer thus treated to treatment with the use of a solvent having a selective solubility only to the shell of each of the microballoons to remove the shell of each of the microballons, whereby pores based on the microballoons are communicated with each other thereby forming a filter.

The step of disposing the microballoons-containing hardening resin dispersion layer is preferred to be conducted after the formation of the liquid chamber. However, it may be conducted at anytime after the formation of the solid layer and before the removal of the solid layer. The step of removing the shells of the microballoons may be conducted simultaneously with the removal of the solid layer.

As for the microballoons-containing hardening resin dispersion, there may be employed a manner wherein the hardening resin dispersion is injected into the liquid chamber, followed by heat treatment, whereby pores based on the microballoons are formed or a manner wherein microballoons are provided, the microballoons are subjected to heat treatment to expand each of them, the resultant expanded microballoons are dispersed into a binder resin to obtain a microballoons-containing hardening resin dispersion, and the microballoons-containing hardening resin dispersion is injected into the liquid chamber, followed by heat treatment, whereby pores based on the microballoons are formed. Of these two manners, to employ which manner should be determined having a due care about the scale of the liquid chamber, the size of the ink supply port and the structure of the liquid chamber. The application of the microballoons-containing hardening resin dispersion may be conducted by means of the conventional screen printing or transfer printing technique, or the conventional dispenser injection technique. These application techniques may be selectively employed depending upon the kind of the microballoon used and the manner of expanding the microballoon.

In a preferred embodiment, the layer of the microballoons-containing hardening resin dispersion is disposed in the common liquid chamber. Other than this, it may be disposed in a space portion of the common liquid chamber as a member which is different from other constituent elements.

The substrate is desired to be provided with an element for generating ink discharging energy. The ink discharging energy-generating element is desired to be an electrothermal converting body.

In the case where the ink jet head constituted as above described is mounted in an ink jet apparatus, it makes the ink jet apparatus to exhibit a printing performance superior to that in the prior art.

The present invention will be described in more detail with reference to the following examples, which are provided here for illustrative purposes only, and are not intended to limit the scope of the present invention.

EXAMPLE 1

Figure 5:
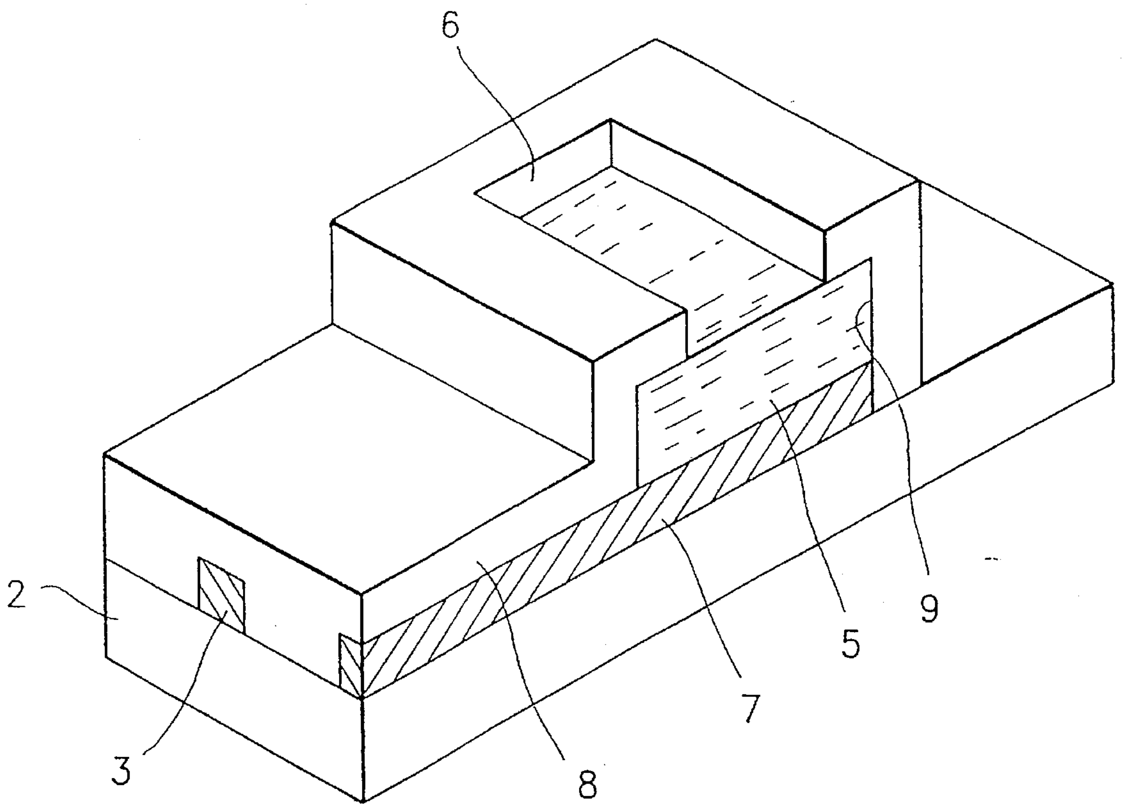
FIG. 5 is a schematic view for explaining an example of the process for producing an ink jet head based on the present invention, showing that a porous hardening resin resulted after shells of microballoons having been removed serves as a filter.

FIG. 5 is a schematic view illustrating a state of a dispersion for the formation of a filter which is injected in a common liquid chamber, said dispersion comprising a number of microballoons dispersed in a binder resin.

Figure 6:
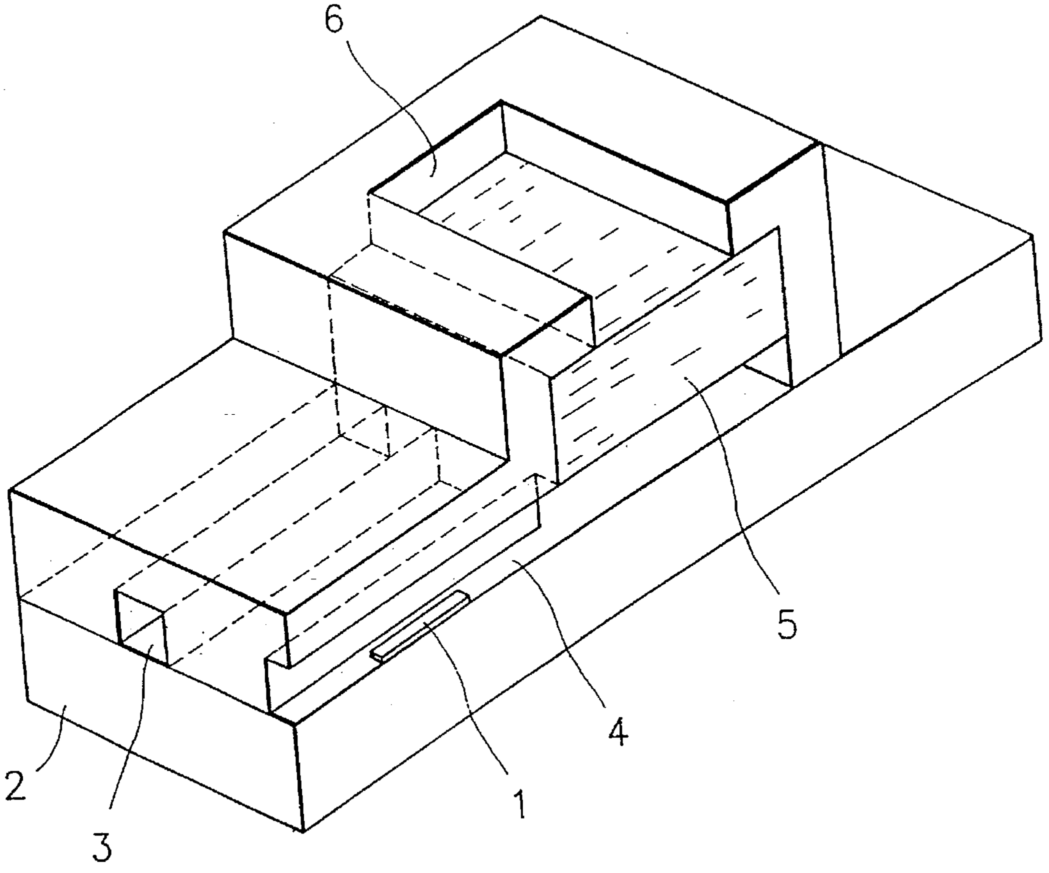
FIG. 6 is a schematic view illustrating a situation a minute hollow bodies-containing hardening resin is poured into a common liquid chamber.

FIG. 6 is a schematic view illustrating a state of the binder resin having a porous structure formed after the resin shells of the microballons having been removed which functions as a filter.

In FIGS. 5 and 6, reference numeral 1 indicates an electrothermal converting element, reference 2 a base member, reference numeral 3 a discharging outlet (or an orifice), reference numeral 4 an ink pathway, reference numeral 5 a dispersion layer, reference numeral 6 an ink supply port, reference numeral 7 a resist, reference numeral 8 a second base member, and reference numeral 9 a common liquid chamber.

First, on a silicon base member having electrothermal converting bodies (comprised of $HfB_2$) formed thereon, there was formed a 50 μm thick photosensitive layer by laminating a positive type dry film OZATEC R225 (trademark name, produced by Hoechst Japan Kabushiki Kaisha) thereon. The photosensitive layer was subjected to irradiation of ultraviolet rays while shielding a given portion thereof for forming ink pathways, followed by subjecting the resultant to spray development using a 1% aqueous solution of caustic soda. Thereafter, a solid layer (of 50 μm in thickness) was formed in a liquid flow path-forming area including the electrothermal converting bodies on the silicon base member. Araldite CY230/HY956 (trademark name, produced by Chiba Geigy Company) as an epoxy resin was applied onto the substrate having the solid layer thereon by means of a conventional applicator, followed by allowing to stand at 30° C. for 12 hours, whereby the hardening resin on the substrate was completely hardened. To the substrate having the hardened material stacked thereon, a glass member as a top plate having a concaved portion in a liquid chamber-forming area and a throughhole (ink supply port 6) at the center of the concaved portion was joined while positioning the location of the liquid chamber-forming area as desired.

Then, a dispersion for the formation of a filter according to the present invention comprising a number of microballoons dispersed in a binder resin was applied onto the solid layer through the ink supply ports 6 by means of a conventional dispenser. As the above dispersion, there was used a dispersion obtained by adding 50 wt. % of Expancel 551DE-20 microballoons (trademark name, produced by Expancel Company) to ODER SY25 (trademark name, produced by Tokyo Ohka Kabushiki Kaisha) as a photosensitive hardening resin to obtain a mixture and homogenizing the mixture. As for the amount of the microballoons, it was made to be 50 wt. % here, but it can be made to be in the range of 20 to 90 wt. %.

The assembly comprising the substrate and top plate was subjected to irradiation of ultraviolet rays, whereby the solid layer was solubilized. The resultant was immersed in an aqueous NaOH solution in an ultrasonic washing vessel for about 10 minutes, whereby the solubilized solid layer was removed by resolving it in the solvent. The resultant obtained was washed with pure water, followed by drying. Thus, the formation of an ink jet head was completed.

The filter formed was found to have a fluid resistance in the range of 10 to 100 mmAq, wherein a good correlation was attained in relation to the flow amount of ink.

Using the ink jet head obtained, printing was conducted for 3,000 sheets at a A4 size 7.5% duty and under condition of 10 KHz for the discharging frequency. As a result, a high quality print with no accompaniment of a defect was continuously provided without causing non-discharging.

EXAMPLE 2

Figure 7:
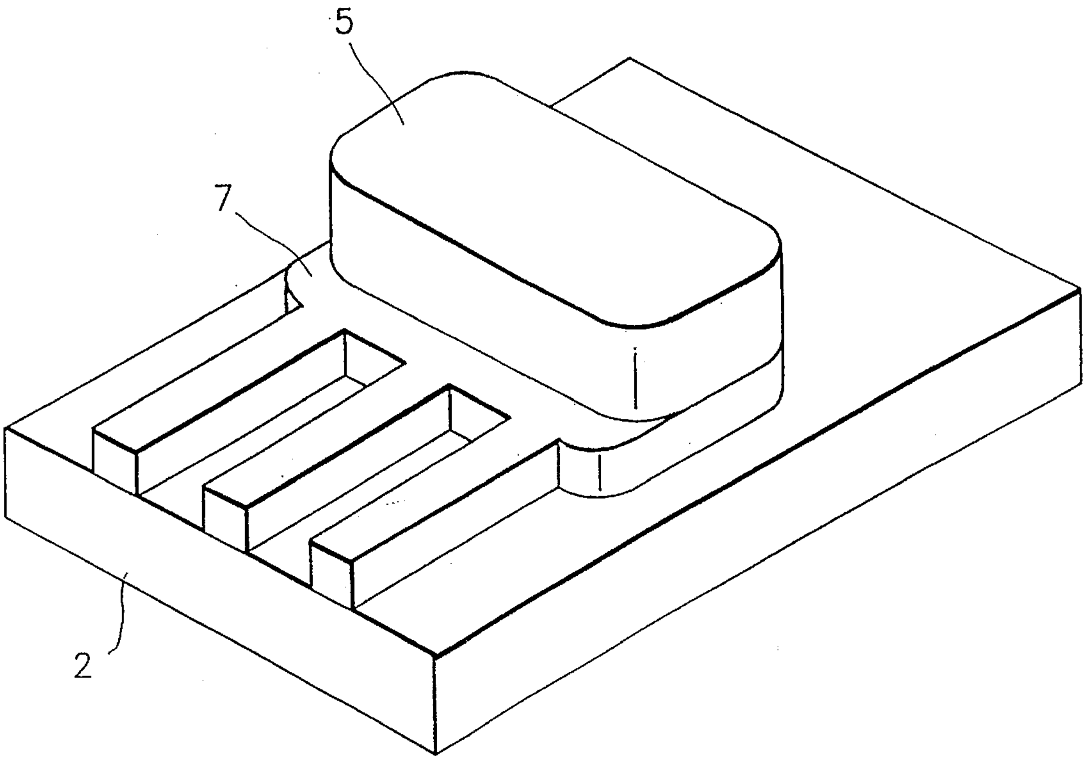
FIG. 7 is a schematic view for explaining another example of a process for producing an ink jet head according to the present invention.

FIG. 7 is a schematic view for explaining a process for producing an ink jet head in this example. In FIG. 7, reference numeral 2 indicates a base member, reference numeral 5 a dispersion for the formation of a filter, comprising a number of microballoons dispersed in a binder resin, and reference numeral 7 a resist (a solid layer).

In the case of Example 1, the microballoons having been expanded were dispersed in the resist and the resultant was injected into the common liquid chamber. In this example, the procedures of Example 1 were repeated. That is, there was obtained a dispersion for the formation of a filter in the same manner as in Example 1, except for using non-expanded Expancel 551DU microballoons. The dispersion obtained was applied onto a resist pattern by a conventional screen printing technique, followed by drying at 60° C. for 2 hours. The dispersion layer having been dried was found to have a thickness of 100 u±10 um, wherein no any defect (such as film removal, a variation in the film thickness, print bleeding and the like upon the screen printing) was not observed. Prior to joining the top plate to the substrate, the dried dispersion layer was subjected to heat treatment at 120° C., wherein the microballoons being dispersed in the binder resin started expanding and after the laps of 3 minutes, the layer thickness become 180 um. By this, a number of hollow spheres having a diameter of 60 μm in mean value were formed. Then the top plate was joined to the substrate. After this, the resin shells of the expanded microballoons were etched with a solvent to form a number of pores communicated with each other. Thus, there was formed a filter. In this example, the non-expanded microballoons in the dispersion layer were of 7 μm in volume average particle size and the expanded microballoons were of about 20 um in volume, average particle size.

Using the ink jet head obtained, printing was conducted for 3,000 sheets at a A4 size 7.5% duty and under condition of 10 KHz for the discharging frequency. As a result, a high quality print with no accompaniment of a defect was continuously provided without causing non-discharging.

As apparent from the description in Examples 1 and 2, it is understood that by forming a filter comprised of a hardening resin in a liquid chamber portion on the solid layer, the filter can be integrally formed even in a complicated portion of an ink jet head and the filter formed can be made to have a relatively large area without necessity of fixing the filter by conducting a particular treatment or step. Further, according to the present invention, there can be attained a reduction in the expenses for the assembling process, a reduction in the load for the process control, and an improvement in the yield.

Hence, the present invention makes it possible to provide a highly reliable ink jet head capable of conducting high speed printing at a reduced production cost.

(Others)

The present invention provides prominent effects in an ink jet head or an ink jet apparatus, especially of the system in which a thermal energy generating means (for example, an electrothermal converting body or laser beam) for generating a thermal energy as the energy utilized for discharging ink is installed and a state change is caused for the ink by virtue of the thermal energy. According to such system, there can be attained dencification and high definition.

As for the representative constitution and the principle, it is desired to adopt such fundamental principle as disclosed, for example, in U.S. Pat. No. 4,723,129 or U.S. Pat. No. 4,740,796. While this ink jet system is capable of applying to either the so-called on-demand type or the continuous type, it is particularly effective in the case of the on-demand type because, by applying at least one driving for providing a rapid temperature rise exceeding nucleate boiling in response to printing information to an electrothermal converting element disposed for a sheet on which printing liquid (ink) is to be held or for a liquid pathway, the electrothermal converting element generates thermal energy to cause film boiling on a heat acting face of the ink jet head and as a result, a bubble can be formed in the printing liquid (ink) in a one-by-one corresponding relationship to such driving signal. By way of growth and contraction of the bubble, the printing liquid (ink) is discharged through a discharging outlet to form at least one droplet. It is more desirable to make the driving signal to be of a pulse shape, since in this case, growth and contraction of a bubble take place instantly and because of this, there can be attained discharging of the printing liquid (ink) excelling particularly in responsibility.

As the driving signal of pulse shape, such driving signal as disclosed in U.S. Pat. No. 4,463,359 or U.S. Pat. No. 4,345,262 is suitable. Additionally, in the case where those conditions disclosed in U.S. Pat. No. 4,313,124, which relates to the invention concerning the rate of temperature rise at the heat acting face, are adopted, further improved printing can be conducted.

As for the constitution of the ink jet head, the present invention includes, other than those constitutions of the discharging outlets, liquid pathways and electrothermal converting elements in combination (linear liquid flow pathway or perpendicular liquid flow pathway) which are disclosed in the above mentioned patent documents, the constitutions using such constitution in which a heat acting portion is disposed in a curved region as disclosed in U.S. Pat. No. 4,558,333 or U.S. Pat. No. 4,459,600. In addition, the present invention may effectively take a constitution based on the constitution in which a slit common to a plurality of electrothermal converting elements is used as a discharging portion of the electrothermal converting elements, which is disclosed in Japanese Unexamined Patent Publication No. 123670/1984 or another constitution in which an opening for absorbing a pressure wave of thermal energy is made to be corresponding to a discharging portion, which is disclosed in Japanese Unexamined Patent Publication No. 138461/1984. Particularly, in any configuration for the ink jet head to take, the situation is ensured to effectively conduct printing according to the present invention.

Further, the present invention is effective in the case of a full-line type ink jet head having a length corresponding to the maximum width of a printing medium on which printing can be performed. This full-line type ink jet head may be of such constitution in which a plurality of ink jet heads are combined so as to satisfy the length desired or such constitution in which they are integrated into a full-line head.

The present invention is effective also in the case of such serial type as above described, or in the case of an ink jet head of the exchangeable chip type wherein electric connection to an apparatus body or supply of ink from the apparatus body is enabled when it is mounted on the apparatus body, or in the case of another ink jet head of the cartridge type wherein an ink tank is integrally disposed on the ink jet head itself.

Further, it is desirable to add discharge recovery means or appropriate preparatory auxiliary means to an ink jet apparatus according to the present invention in view of further stabilizing the ink jet apparatus. As such means, there can be illustrated capping means for the ink jet head, cleaning means therefor, pressing or sucking means, preliminary heating means by the electrothermal converting means or by a combination of the electrothermal converting body and additional heating element and means for preliminary discharging not for the printing operation.

As regards the kinds and number of the ink jet heads mountable, it may be a single corresponding to a single color, or may be plural corresponding to a plurality of inks having different recording colors or densities. Particularly, the present invention is effectively applicable to an ink jet apparatus having at least one of a monochromatic mode mainly with black and a multi-color with different colors and a full-color mode by the mixture of the colors which may be an integrally formed unit or a combination of a plurality of ink jet heads.

In the above-described embodiments of the present invention, explanation has been made with the use of liquid ink. But in the present invention, it is possible to use such ink that is in the solid state at room temperature or other ink which becomes to be in the softened state at room temperature. In the foregoing ink jet apparatus, it is usual to adjust the temperature of ink itself to be in the range of 30° C. to 70° C. such that the viscosity of the ink lies in the range capable of being stably discharged. In view of this, any ink can be used as long as it is in the liquid state upon the application of a use printing signal. It is also possible to use those inks having a property of being liquefied, for the first time, with thermal energy, such that such ink can be liquefied and discharged in the liquid state upon the application of thermal energy depending upon a printing signal or other ink that can start its solidification beforehand at the time of its arrival at a printing member in order to prevent the temperature of the ink jet head from raising due to thermal energy purposely used as the energy for a state change of ink from solid state to liquid state or in order to prevent ink from being vaporized by solidifying the ink in a state of being allowed to stand. In the case of using these inks, they can be used in such a manner as disclosed in Japanese Unexamined Patent Publication No. 56847/1985 or Japanese Unexamined Patent Publication No. 71260/1985 in which ink is maintained in concaved portions or penetrations of a porous sheet in the liquid state or in the solid state and the porous sheet is arranged to provide a configuration opposite the electrothermal converting element.

In the present invention, it is the most effective to conduct the foregoing film boiling manner for each of the above described inks.

Further, the ink jet apparatus according to the present invention may be appropriately configured such that it can be used as image outputting terminals in information processing devices such as computers or as copying devices which are combined with readers. Other than this, it can be configured to have a configuration as a facsimile device having a transmit-receive function.

As for the filter according to the present invention, the above description has been directed to its use in an ink jet apparatus. However, the use of the filter according to the present invention is not limited only to this but the filter is also usable in other fields, wherein it sufficiently exhibits its effects.

TABLE 1

| | binder resin | microballoons | content (wt %) | drying conditi-tions | heating temperature (°C.) | solvent | mean diameter of pores formed (μm) | disper-sion state | fluid resistance (mmAq) | filter perfor-mance |
|---|---|---|---|---|---|---|---|---|---|---|
| Experiment 1 | ODER SY25 (photosensitive) | EXPANCEL 551DU (non-expanded) | 50 | 60° C. 2 Hr | 120 | acetone | 20 | M | 10~100 | o |
| Experiment 2 | ODER SY25 (photosensitive) | EXPANCEL 551DE (expanded) | 50 | 60° C. 2 Hr | — | acetone | 20 | M | 10~100 | o |
| Experiment 3 | NITRON T-8526 (heat curable) | EXPANCEL 551DU (non-expanded) | 50 | 60° C. 2 Hr | 120 | acetone | * | M | — | X |
| Experiment 4 | NITRON T-8526 (heat curable) | EXPANCEL 551DE (expanded) | 50 | 60° C. 2 Hr | — | acetone | 20 | H | 10~100 | o |
| Experiment 5 | NITRON T-8526 (heat curable) | EXPANCEL 551DU (non-expanded) | 50 | — | 120 (heated quickly) | acetone | 20 | M | 10~100 | o |
| Experiment 6 | ODER SY25 (photosensitive) | EXPANCEL 551DU (non-expanded) | 50 | 60° C. 2 Hr | 120 | acetone | 20 | M | — | X |
| Experiment 7 | ODER SY25 (photosensitive) | EXPANCEL 551DU (non-expanded) | 10 | 60° C. 2 Hr | 120 | acetone | 20 | L | — | X |
| Experiment 8 | ODER SY25 (photosensitive) | EXPANCEL 551DU (non-expanded) | 20 | 60° C. 2 Hr | 120 | acetone | 20 | M | 10~100 | o |
| Experiment 9 | ODER SY25 (photosensitive) | EXPANCEL 551DU (non-expanded) | 90 | 60° C. 2 Hr | 120 | acetone | 20 | M | 10~50 | o |
| Experiment 10 | ODER SY25 (photosensitive) | EXPANCEL 551DU (non-expanded) | 95 | 60° C. 2 Hr | 120 | acetone | 20 | H | ∞ | X |

*microballoon was not expanded, and no pore was formed.

We claim:

1. A process for producing a filter for the filtration of a liquid, comprising the steps of: dispersing a number of microballoons each having a shell constituted by a solvent-soluble resin in an activation energy setting resin to obtain a dispersion, subjecting said dispersion to heat treatment to expand each of the microballoons, hardening the activation energy setting resin, treating the resultant with a solvent having a selective solubility to only the shell of each of the microballoons to remove all the shells of the microballoons whereby pores formed on the basis of the microballoons are communicated with each other.

2. The process for producing a filter according to claim 1, wherein the microballoons comprise respectively a core composed of a material capable of expanding and vaporizing at a temperature which is higher than room temperature, said core being contained in a shell composed of a thermoplastic resin as a main component.

3. The process for producing a filter according to claim 2, wherein the core material is composed of a material selected from the group consisting of iosobutane and isobutylene.

4. The process for producing a filter according to claim 2, wherein the thermoplastic resin contains as a main constituent at least a component selected from the group consisting of polyvinyl chloride, polyvinylidene chloride, vinyl chloride-vinyl chloride copolymer, acrylonitrile-vinyl chloride copolymer, and vinyl acetate-vinyl chloride copolymer.

5. The process for producing a filter according to claim 1, wherein the activation energy-setting resin is a hardening resin which can be hardened with the action of thermal energy or light energy.

6. The process for producing a filter according to claim 1, wherein the filter produced has a thickness of 5 times or more the diameter of the pore in parallel to the direction of a liquid to be supplied.

7. The process for producing a filter according to claim 1, wherein the content of the microballoons in the activation energy setting resin is 20 to 90 wt. %.

8. The process for producing a filter according to claim 1, wherein the selective solubility-bearing solvent is selected from the group consisting of acetone and dimethylformamide.

9. The process for producing a filter according to claim 1, wherein the filter produced is used in a part of an ink supply path of an ink jet apparatus.

* * * * *

UNITED STATES PATENT AND TRADEMARK OFFICE
CERTIFICATE OF CORRECTION

PATENT NO. : 5,662,844
DATED : September 2, 1997
INVENTOR(S) : Akira Goto, et al.

It is certified that error appears in the above-indentified patent and that said Letters Patent is hereby corrected as shown below:

Title Page, [57] Abstract: line 5, delete "another".

Column 1, lines 14, 43 and 46, delete "whereby", each occurrence, and insert therefor --thereby--;
Line 21, delete "potable" and insert therefor --portable--;
Line 30, delete "an";
Line 55, delete "until" and insert therefor --into--;
Line 57, delete "smaller" and insert therefor --small--;
Line 59, delete "a" and insert therefor --at--.

Column 2, line 10, delete "achieve" and insert therefor --achieves--;
Line 17, delete "manner" and insert therefor --manners--;
Line 21, delete "sivel" and insert therefor --sively--;
Lines 24, 36 and 53, delete "an", each occurrence, and insert therefor --a--;
Line 28, after "material", insert --used--;
Line 66, delete "thermosetting" and insert therefor --thermoplastic--.

Column 3, line 23, delete "exhibit" and insert therefor --exhibits--.

Column 4, line 33, after "invention", insert --may--.

Column 5, line 38, delete "does" and insert therefor --is--;
Line 44, delete "Expansel" and insert therefor --Expancel--;
Lines 48 and 60, delete "microballons", both occurrences, and insert therefor --microballoons--.

UNITED STATES PATENT AND TRADEMARK OFFICE

CERTIFICATE OF CORRECTION

PATENT NO. : 5,662,844
DATED : September 2, 1997
INVENTOR(S) : Akira Goto, et al.

It is certified that error appears in the above-indentified patent and that said Letters Patent is hereby corrected as shown below:

Column 6, lines 20, 21 and 27, delete "microballons", each occurrence, and insert therefor --microballoons--;
Lines 23 and 27, after "each of", both occurrences, insert --the--;
Line 31, delete "pore" and insert therefor --core--;
Line 32, delete "becomes" and insert therefor --comes--.

Column 7, line 30, delete "lower" and insert therefor --low--;
Line 32, delete "these" and insert therefor --this--.

Column 8, line 27, delete "attentions" and insert therefor --attention--;
Line 39, delete "the", second occurrence.

Column 9, line 31, delete "became" and insert therefor --came--.

Column 10, line 13, delete "microballons" and insert therefor --microballoons--.

Column 12, line 9, delete "other" and insert therefor --another--;
Line 10, after "may", insert --be--;
Line 14, after "by", insert --a--;
Line 20, after "serves", insert --to--;
Line 32, before "row", insert --a--;
Line 42, delete "of".

UNITED STATES PATENT AND TRADEMARK OFFICE
CERTIFICATE OF CORRECTION

PATENT NO. : 5,662,844

DATED : September 2, 1997

INVENTOR(S) : Akira Goto, et al.

It is certified that error appears in the above-indentified patent and that said Letters Patent is hereby corrected as shown below:

Column 13, line 14, delete "by" and insert therefor --for a--;
Line 29, delete "of", second occurrence;
Line 38, delete "flame" and insert therefor --frame--
Line 44, after "as", insert --a--;
Line 51, before "present", insert --to the--.

Column 14, line 2, delete "entire" and insert therefor --entirety thereof--;
Line 16, delete "elementes" and insert therefor --elements--.

Column 15, line 1, delete "a" and insert therefor --an--;
Lines 4, 12 and 17, delete "whereby" and insert therefor --thereby--;
Line 9,, after "wherein", insert --in--;
Line 10, delete "of";
Line 11, delete "which";
Line 14, delete "a", second occurrence, and insert therefor --an--;
Line 26, delete "are" and insert therefor --is--.

Column 16, line 7, delete "microballons" and insert therefor --microballoons--.

Column 17, line 15, delete "to", first occurrence;
Line 29, delete "microballons" and insert therefor --microballoons--;
Line 32, after "reference", insert --numeral--;
Line 52, delete "Chiba" and insert therefor --Ciba--.

UNITED STATES PATENT AND TRADEMARK OFFICE
CERTIFICATE OF CORRECTION

PATENT NO. : 5,662,844
DATED : September 2, 1997
INVENTOR(S) : Akira Goto, et al.

It is certified that error appears in the above-indentified patent and that said Letters Patent is hereby corrected as shown below:

Column 18, line 20, delete "a" and insert therefor --an--;
Line 41, delete "any";
Line 43, delete "not";
Line 47, delete "laps" and insert therefor --lapse--.

Column 20, line 33, delete "becomes" and insert therefor --comes--;
Line 61, delete "the", second occurrence.

Signed and Sealed this

Twenty-sixth Day of May, 1998

Attest:

BRUCE LEHMAN

*Attesting Officer* *Commissioner of Patents and Trademarks*